(No Model.)

W. H. RICHARDS.
PIPE JOINT.

No. 337,867. Patented Mar. 16, 1886.

Witnesses—
Walter Reese
Jno Vintmister

Inventor—
William H Richards
Per Jacob Reese Attorney

N. PETERS. Photo-Lithographer, Washington, D. C.

UNITED STATES PATENT OFFICE.

WILLIAM H. RICHARDS, OF McKEESPORT, PENNSYLVANIA.

PIPE-JOINT.

SPECIFICATION forming part of Letters Patent No. 337,867, dated March 16, 1886.

Application filed January 7, 1886. Serial No. 187,878. (No model.)

*To all whom it may concern:*

Be it known that I, WILLIAM H. RICHARDS, of McKeesport, in the county of Allegheny and State of Pennsylvania, have invented a new and useful Improvement in Pipe-Joints; and I hereby declare the following to be a full, clear, and exact description thereof, reference being had to the drawings forming a part of same, in which—

Figure 1:
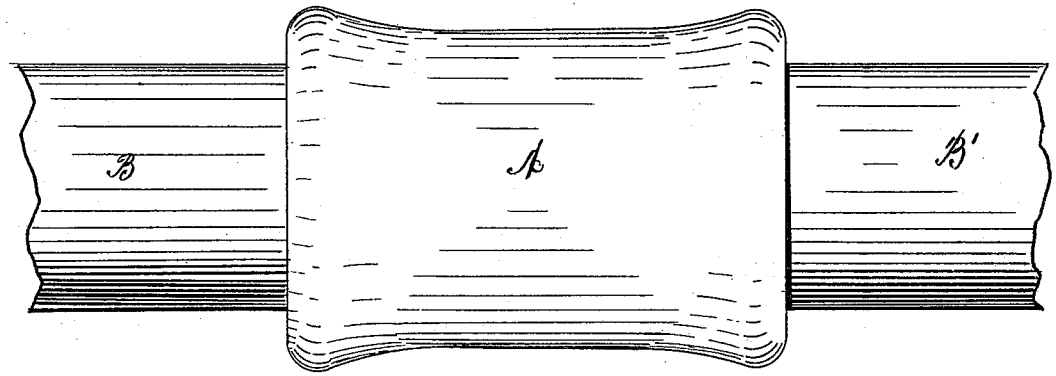
Figure 2:
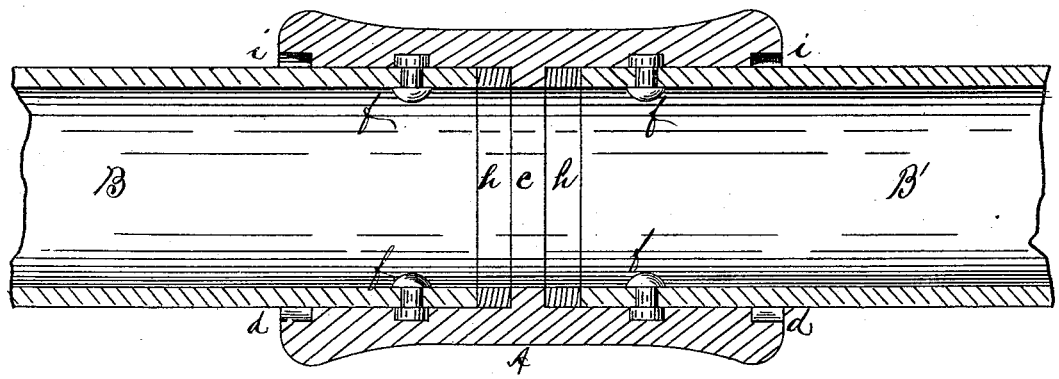
Figure 3:
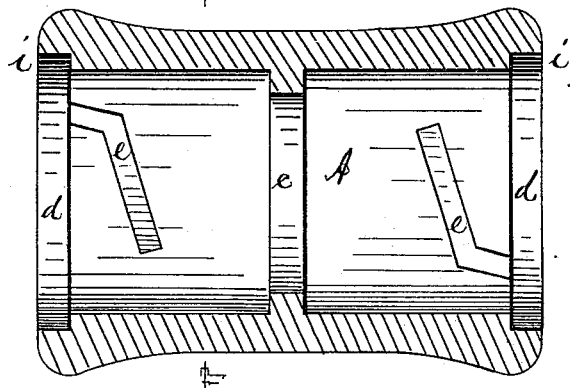

Figure 1 is a front elevation of my improved pipe-joint with the pipes in place. Fig. 2 is a sectional view of same. Fig. 3 is a sectional view of the socket without the pipes.

Like letters refer to like parts.

My improvement is designed for use in all cases where a good tight pipe-joint is desired, but it is more especially adapted as a natural-gas-pipe joint.

Natural gas comes from the earth at a pressure ranging as high as five hundred pounds to the square inch, and owing to the high pressure and the penetrating character of the gas a most perfect joint is required to prevent the gas from escaping.

In the construction of my improved pipe-joint I make the barrel or socket A of cast-iron or cast-steel, with an internal diameter so as to permit the insertion of the pipes B and B'. This barrel A has an internal projection equal to the thickness of the pipe, as shown at $c$ in Figs. 2 and 3. At the ends there is an enlargement of the internal diameter shown at $d$ in Figs. 2 and 3. The barrel is also provided with two interior slotted grooves at each end. These grooves run nearly longitudinally for a short distance and then obliquely around the barrel, as shown at $e$ in Fig. 3.

In the construction of my pipe-joint I do not cut a thread in the barrel nor on the pipe; but in preparing the pipe care must be taken to turn down the ends of the pipe true and smooth, after which two holes are bored through the pipe near the ends and rivets placed in the holes and riveted in such a manner as to leave but a slight projection on the inside and a projecting head of about three-eighths of an inch on the outside, as shown at $f$ in Fig. 2. The exact size of these projecting rivets will correspond with the depth of the internal slot, $e$, Fig. 3. When the pipes and barrel are so prepared, two suitable gaskets, made of gum, leather, lead, copper, or other flexible material, are placed in the barrel—one at each end—and pushed up against $c$. The end of the pipes are then put in the barrel in such manner that the projecting rivet-heads $f$ will enter the slots $e$, Fig. 3. The pipes should then be turned so that $f$ will traverse the oblique groove, and by this means the pipes B and B' are pressed up against the gaskets $h$ and the joint is made gas-tight.

Should the gas-joint leak at any time, a molten-lead gasket may be run in between the barrel and the pipe at $i$, Fig. 2, and calked in the usual manner.

My improved pipe-joint is strong, simple of construction, and gas-tight. It can be put together or taken apart in less time than any other joint known to me.

In order to define more clearly the nature and scope of my invention, I would have it understood that I do not seek to claim anything shown in the patent to Russell and Gordon, No. 284,146, dated August 28, 1883; but

What I claim as my invention, and desire to secure by Letters Patent, is—

The combination, with the socket having the centrally-located internal projection, and of enlarged diameter at its ends, and having the angular grooves or channels $e$, of the pipes having openings, and headed rivets located in said openings and engaging the grooves or channels, and the gaskets $h$ on opposite sides of the internal projection, the pipes bearing against said gaskets, as set forth.

WILLIAM H. RICHARDS.

Witnesses:
W. M. GORMLY,
DANIEL SWOYER.